United States Patent

Duling et al.

[11] 3,791,856
[45] Feb. 12, 1974

[54] METHOD OF PREPARING POLYMER COATED-WAX IMPREGNATED CELLULOSIC STOCK

[75] Inventors: Irl N. Duling, West Chester; John C. Merges, Jr., Glen Mills, both of Pa.

[73] Assignee: Sun Research and Development Co., Philadelphia, Pa.

[22] Filed: July 15, 1971

[21] Appl. No.: 163,041

Related U.S. Application Data

[63] Continuation-in-part of Ser. No. 884,847, Dec. 15, 1969, abandoned, which is a continuation-in-part of Ser. No. 745,884, July 18, 1968, abandoned.

[52] U.S. Cl. ..... 117/155 UA, 117/65.2, 117/155 R, 117/157, 117/158, 111/168
[51] Int. Cl. .......................... D21h 1/28, D21h 1/36
[58] Field of Search.. 117/65.2, 92, 143 R, 155 UA, 117/158, 168, 155 R, 157

[56] References Cited
UNITED STATES PATENTS

| | | | |
|---|---|---|---|
| 2,791,569 | 5/1957 | Backluad | 117/155 X |
| 3,428,591 | 2/1969 | Lewis | 117/158 X |
| 3,433,665 | 3/1969 | Harvey et al. | 117/158 X |
| 3,515,691 | 6/1970 | Arabian | 117/158 X |
| 3,522,081 | 7/1970 | Moyer | 117/158 X |
| 3,554,950 | 1/1971 | Sauer | 117/158 X |
| 3,580,736 | 5/1971 | Moyer et al. | 117/158 X |
| 3,632,426 | 1/1972 | Kohn et al. | 117/158 |
| 3,653,958 | 4/1972 | Kohn et al. | 117/158 |
| 3,353,992 | 11/1967 | Grenleg et al. | 117/138.8 |
| 3,558,542 | 1/1971 | McDonald | 260/27 |
| 3,577,373 | 5/1971 | Kremer et al. | 260/23 |

Primary Examiner—William D. Martin
Assistant Examiner—M. R. Lusignan
Attorney, Agent, or Firm—George L. Church; Donald R. Johnson; Anthony Potts, Jr.

[57] ABSTRACT

Porous cellulosic stock can be coated with a thermoplastic polymer coating while being impregnated with a wax by this invention. A dispersion of polymer particles in molten wax is applied to cellulosic stock at a temperature below the melting point of the polymer. This treated cellulosic stock is then heated to a temperature above the melting point of the polymer and subjected to pressure. The resulting laminated product is polymer coated-wax impregnated cellulosic stock. The polymer used must be substantially insoluble in the molten wax at a temperature below the melting point of the polymer and must be fusible below a temperature which would degrade the stock. This product has utility as a packaging material comprising a high water vapor barrier coupled with a tough, scuff-resistant, non-blocking surface.

9 Claims, 2 Drawing Figures

3,791,856

PATENTED FEB 12 1974

INVENTORS
IRL N. DULING
JOHN C. MERGES JR.

BY W.C. McCorquodale, Jr.
ATTORNEY ature 3,791,856

METHOD OF PREPARING POLYMER COATED-WAX IMPREGNATED CELLULOSIC STOCK

CROSS REFERENCE TO RELATED APPLICATIONS

This application is a continuation-in-part of our copending application Ser. No. 884,847; filed Dec. 15, 1969 now abandoned, which was a continuation-in-part of our copending application Ser. No. 745,884, filed July 18, 1968, now abandoned. Copending applications Ser. No. 884,879, now U.S. Pat. No. 3,665,068, which relates to a method of forming porous objects of polyethylene having an extremely high molecular weight and Ser. No. 885,355, now abandoned, which relates to a method of extruding extremely high molecular weight polyolefins, are also continuations-in-part of application Ser. No. 745,884. Both of these latter applications were filed of even date with Ser. No. 884,847.

BACKGROUND OF THE INVENTION

The present invention provides a method for impregnating porous cellulosic stock with wax, which imparts a high water vapor barier to the stock, while coating the stock with a polymer which imparts a tough, scuff-resistant, non-blocking surface to the stock. The method can be used to apply a polymer coating to one or both surfaces of the stock.

Coating paper with polyethylene particles having about a 300,000 molecular weight as an aqueous dispersion was recently reported in TAPPI, December 1968, Vol. 51, No. 12, "Paper Coating with Polyethylene Dispersion," L. R. Ridgeway et al., pages 129A-1-32A. After an aqueous dispersion containing 60 percent polyethylene has been applied to kraft paper the combination is heated to evaporate the water and fuse the polymer particles. For food packaging paper requiring only a moderate degree of moisture protection two separate applications of the dispersion are required.

The advantages of the present invention, compared to the heretoformentioned aqueous dispersion technique, are that no heat is required to evaporate water and an impregnation of the cellulosic stock with wax occurs and imparts a high degree of impermeability to moisture.

SUMMARY OF THE INVENTION

Porous cellulosic stock can be impregnated with wax and coated with a polymer by the method described herein. The polymer must be substantially insoluble in the molten wax at a temperature below the melting point of the polymer. A dispersion of the polymer in molten wax, at a temperature below the melting point of the polymer, is applied to the porous cellulosic stock. Afterwards, the temperature of the applied coating is raised to above the melting point of the polymer but below the degradation temperature of the stock and pressure is applied causing the melted polymer particles to form a continuous polymer coating. The resulting wax impregnated cellulosic stock coated on one or both surfaces with a polymer has utility as packaging material with a high water vapor barrier. In addition the coated surfaces are resistant to scuffing, are non-blocking and have a glossy attractive finish. Examples of thermoplastic polymers which can be used with this invention are as follows: polyethylene with a molecular weight in excess of 1,000,000, polypropylene with a molecular weight in excess of 100,000, acrylonitrile-butadiene-styrene copolymer hereinafter referred to as ABS, polyacetal polyacrylic, cellulosic polymer, ionomer polymer, methylpentene polymer, polyamide, polycarbonate, phenylene oxide polymer, polystyrene, unplasticized polyvinyl chloride, polyvinylidene chloride, and thermoplastic polyester.

DESCRIPTION

Figure 1:
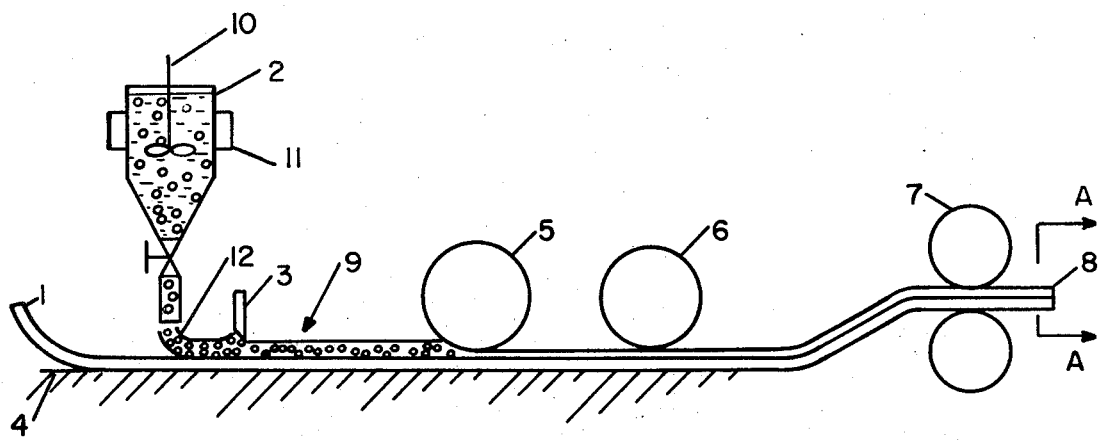
FIG. 1 schematically illustrates one method of applying the wax-polymer dispersion to cellulosic stock in accordance with the invention.

A method of preparing polymer coated-wax impregnated cellulosic stock according to this invention is illustrated in FIG. 1. Finely divided thermoplastic polymer and solid wax are placed in a suitable container 2. The temperature of the polymer and wax in the container is raised to above the melting point of the wax but below the melting point of the polymer by a suitable heater 11. After the wax melting sufficient agitation is applied by a conventional mixer 10 to keep the finely divided polymer uniformly distributed throughout the molten wax. The dispersion in the container 2 is transferred, in this illustration by gravity, to the cellulosic stock 1 in front of the doctor blade 3. As soon as the dispersion contacts the stock absorption of the wax in dispersion by the stock begins. The cellulosic stock 1 moves on a smooth flat surface 4 towards the doctor blade 3. The temperature of the molten wax-polymer dispersion is maintained below the melting point of the polymer. The doctor blade 3 causes a predetermined thickness of dispersion 12 to be deposited on the stock 1. The covered stock, as indicated by 9, travels to a hot roll 5, where the higher temperature causes most of the remaining wax to be rapidly absorbed by the stock and the polymer to melt while the pressure spreads the molten particles into one continuous coating. Afterwards the stock is cooled by cold roll 6 and rollers 7 move the finished product 8 away.

Figure 2:
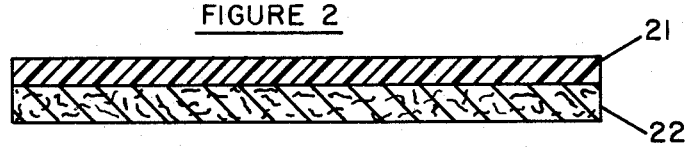
FIG. 2 is a cross-sectional view of the finished laminated product.

FIG. 2 is a cross-sectional view along section AA in FIG. 1 of the finished product 8 prepared by the above-described method. The substrate layer 22 represents the cellulosic stock 1 now impregnated with wax from the wax-polymer dispersion 12. The substrate layer 22 is covered with a continuous polymer coating 21, the polymer being from the wax-polymer dispersion 12. Because most of the wax is absorbed by the stock 22 and the polymer is substantially insoluble in the molten wax the continuous polymer coating is substantially all polymer.

Since the fusion step in the coating operation results in a practically quantitative separation of the wax from the polymer, the barrier properties of these coatings are those of the polymer film combined with those of the wax-impregnated cellulosic stock. Thus, for example, dry-waxed paper is known to be a good barrier to moisture but a poor one to water vapor or grease. Polymer films, although generally showing excellent resistance to moisture, vary widely in their resistance to both water vapor and grease. Thus, PVC will provide excellent grease resistance but relatively poor water vapor resistance. Polyvinylidene chloride, on the other hand, will give good protection against both water vapor and grease.

In practicing this invention, the cellulosic stock must be able to absorb wax at a reasonable rate. Thus a cellulosic stock coated with a substance or impregnated with a substance which would substantially slow down the wax impregnation rate would be unsatisfactory. Typical wax absorption times for coated and uncoated stocks are shown in the following Table I.

Table I

Wax Absorption Time of Various Cellulosic Stocks

| Stock[2] | Thickness mils | Surface Coating | Wax Absorption Time, minutes [1] |
|---|---|---|---|
| Kraft liner board | 8.5 | No | 1 |
| Corrugated board | 10 | " | 1 |
| Cup board | 14 | " | 3.5 |
| Chip board | 33 | " | 0.5 |
| Oil can cardboard | 26 | " | 0.5 |
| Freezer carton | | | |
| Regular density | 10 | " | 3 |
| Medium density | 18 | " | 0.5 |
| Bread wrapper | 2.5 | — | > 12 |
| Glassine paper | 1.33 | — | > 100 |

[1] Time required for a 0.1 ml. drop of wax to be absorbed into a test sheet at 160°F.

[2] These stocks are defined in THE DICTIONARY OF PAPER, 3rd Edition, American Paper and Pulp Association, 1965.

The data in Table I indicates that a coated stock such as coated oil can cardboard, having a wax absorption time of 6 to 10 minutes, would be a stock which probably should not be used with this invention. However, a coated stock such as medium density freezer carton, having a wax absorption time of 20 to 22.5 minutes, would be a stock which normally would not be used with this invention.

The pulp used to make the various cellulosic stocks that can be used in this invention can be derived from a suitable source such as wood, reclaimed paper, cotton fibers and other fibers such as manila hemp, jute, etc.

Cellulosic stock also refers to wood and porous products made therefrom. Examples of such products are hardboard, particleboard, insulating board and plywood. These boards are defined in *ENCYCLOPEDIA OF CHEMICAL TECHNOLOGY*, Kirk-Othmer, 2nd Edition, Vol. 21, Section Wallboard.

The wax used herein can be a petroleum wax obtained by any one of the processes described in Chapter 5 of *THE CHEMISTRY AND TECHNOLOGY OF WAXES* by A. H. Warth, 2nd Edition and can be any one of the refined or unrefined petroleum waxes described in the same chapter. Synthetic waxes that can be used are described in Chapter 6 of the aforementioned reference.

Petroleum wax is commercially available with a wide range of physical properties. Paraffin waxes are available with melting points from about 126°F. to 153°F. (ASTM D87), oil contents from about 0.1 to about 1.2 percent (ASTM D721), penetration at 77°F. from about 9 to 40 (ASTM D1321), specific gravity at 212°F. from about 0.756 to 0.767 (ASTM D287). Microcrystalline waxes are available with melting points from about 151°F. to 193°F. (ASTM D127), oil contents from about 0.4 to about 1.5 percent (ASTM D721), and specific gravity at 212°F. from about 0.786 to 0.795 (ASTM D287). While these different petroleum waxes will be absorbed at different rates by various cellulosic stocks, our invention can be used with any petroleum wax fraction that will be absorbed by the stock.

If a thermoplastic polymer which is soluble in molten wax at a temperature below the melting point of the polymer is used with this invention the following problems arise. First if the polymer is soluble in the molten wax at a temperature below the melting point of the polymer the viscosity of the resulting combination is drastically increased. This resulting high viscosity combination is very difficult to handle and to apply to the stock. Furthermore on coating the stock the combination is absorbed by the stock. The remaining combination, after being heated to a temperature above the melting point of the polymer and having pressure applied, forms a relatively soft polymer-wax coating on the surface of the stock. Thus to avoid the heretoforementioned problems the thermoplastic polymers which can be used with this invention must be substantially insoluble in the molten wax at a temperature below the melting point of the polymer.

Examples of thermoplastic polymers which are substantially insoluble in the molten wax at a temperature below the melting point of the polymer are as follows: polyethylene with a molecular weight in excess of 1,000,000; polypropylene with a molecular weight in excess of 100,000, ABS, acetal, i.e., homopolymer and copolymer, acrylics, i.e., unmodified and modified, cellulosic, i.e., nitrate, acetate, propionate, butyrate and ethyl cellulose, ionomer, methylpentene polymer, polyamide, phenoxy, phenylene oxide, including the modified forms, polycarbonate, polystyrene, including copolymers of styrene-butadiene and styrene-acrylonitrile, unplasticized polyvinyl chloride which is also referred to as rigid polyvinylchloride, polyvinylidene chloride and thermoplastic polyester. These thermoplastic polymers are defined as to chemical composition, physical properties, and methods of preparation in *MODERN PLASTIC ENCYCLOPEDIA*, Vol. 47, 1970/1971. Generally, polyesters are classed as thermoset polymers; however, a few polyesters are thermoplastic. The latter requires heat to make it formable and after cooling can be reheated and reformed into new shapes a number of times without significant change in properties. A thermoset polymer uses heat to make its shape permanent. After a thermoset is formed into permanent shape, usually with heat and pressure, it cannot be remelted or reformed. The aforementioned polyethylene, polypropylene, polyamide, cellulosic, polystyrene, polycarbonate, polyvinyl chloride and the acrylic are the preferable thermoplastic polymers.

The thermoplastic polymer used in this invention, when added to the wax, is in the form of finely divided particles. If the particles are too large, say passing through 3 mesh but remaining on 20 mesh, the resulting dispersion is unstable in that the particles settle out rapidly causing problems during the application of the dispersion to the stock. All references to mesh herein refers to U. S. Sieve Series. Even if this settling problem can be overcome the resulting polymer coating on the stock is of non-uniform thickness and is not continuous; that is, there are some areas where there is no polymer coating. Thus while this invention is operable if all the polymer particles pass through a 20 mesh, it is preferable that all particles pass through 100 mesh and even more preferable that all particles pass through 200 mesh. Particle size distribution also influences dispersion stability and dispersion viscosity. At the same wax-polymer ratios a wide range particle distribution, compared to a narrow range particle distribution, tends to have a greater viscosity and hence greater stability. The limits as to particle size distribution range can be easily determined by those skilled in the art.

The viscosity of the dispersion depends on the concentration of the polymer in the wax, the affinity of the polymer for wax and particle size and shape. For instance, a dispersion containing 60 weight percent of polymethylacrylate having particle size of 80/100 mesh, has the same flow characteristics of a dispersion containing 25 weight percent of polyethylene having a molecular weight of 2 million and particle size of 100/200 mesh. Spherical particles, as formed in suspension polymerization, flow more readily than those irregularly shaped, such as those resulting from grinding.

The weight ratio of the polymer to the wax used in this invention depends on dispersion stability and dispersion viscosity which in turn depends on polymer particle size and particle size distribution. Satisfactory weight ratios are 5 to 65 parts by weight of finely divided polymer and 35 to 95 parts by weight of wax; the preferable weight ratios are 10 to 55 parts by weight of finely divided polymer and 45 to 90 parts by weight of wax.

The preliminary step in practicing this invention is to prepare the dispersion. The solid wax is placed in a suitable container and heated until the wax becomes molten; but the resulting temperature should not exceed the melting point of the polymer being used. After the wax melts, the polymer is added; mild agitation is usually necessary to form the dispersion. Alternatively, both the solid wax and the polymer particles can be placed in a container and heated together to a temperature below the polymer's melting point. Immediately after the dispersion has been prepared it can be used or it can be cooled and the resulting solid used at a later time. The permissible temperature range used to prepare the dispersion depends on the melting point of the specific wax being used and the melting point of the specific polymer being used.

The dispersion consisting of molten wax and polymer particles is applied to the surface of a cellulosic stock as defined herein. The application of a uniformly thick layer of dispersion to the stock can be obtained by using a doctor blade, or by extruding (curtain coating), or by a roll coater or some other suitable equipment.

As soon as the dispersion touches the stock the wax starts to be absorbed by the stock. The length of time during which this absorption occurs before the application of additional heat and pressure depends on the equipment used, the wax absorption rate of the stock and the amount of wax applied per surface area of stock. This length of time can range from almost zero to many minutes. An example where this length of time is about zero is as follows. An extruded dispersion film containing a relatively small percentage of wax, contacts the stock just as the stock comes in contact with a heated roller. This heated roller raises the temperature of the dispersion above the fusion point of the polymer and applies the desired pressure to the polymer coating. Thus substantially all the wax absorption by the stock occurs while the stock is in contact with the heated roller. On the other hand where this length of time is many minutes long is illustrated by this example. After the dispersion containing a relatively large percentage of wax is applied, the additional heat and pressure is not applied until substantially all the wax is absorbed by the stock. During this long intervening period the temperature of the dispersion must be above the melting point of the wax but below the melting point of the polymer. A minor amount of wax can remain unabsorbed so that the polymer particles remain evenly distributed on the stock during movement of the stock.

After the application of the dispersion to the stock, the coated stock is subjected to additional heat to raise the temperature of dispersion to above the melting point of the polymer and subjected to pressure to cause the melted polymer particles to form the desired continuous smooth coating. However, the maximum temperature of the dispersion cannot exceed a temperature which causes degradation of the stock. For paper, discoloration and/or loss of strength would be examples of degradation caused by too high a temperature. Thus for paper stocks the maximum temperature would be about 500° – 550°F. This degradation temperature limitation means that certain thermoplastic polymers cannot be used with the method defined herein because the polymer's fusion point exceeds the degradation temperature of the stock undergoing coating.

The application of this heat to raise the temperature of the dispersion can precede the application of pressure by some finite time or can be simultaneous with the pressure. The amount of pressure applied depends on the type of polymer and ability of the stock to withstand the applied pressure without undesirable deformation. During this step any wax remaining on the surface is absorbed by the stock.

Subsequently the stock can be allowed to cool or can be cooled by suitable heat removal device. A cold roller would be one example.

The heretoformentioned description discusses only the application of the polymer coating to one surface. In a similar manner a polymer coating could be applied to the other side of the cellulosic stock. In this embodiment the amount of wax applied in the first treatment should not be such that the stock becomes completely impregnated with wax. In other words during the application of the coating on the second side, the partially wax-impregnated stock has to absorb at least most of the wax contained in this other wax-polymer dispersion. The resulting product in this case is a wax-impregnated cellulosic stock having both surfaces coated with the same polymer or with different polymers.

The following examples illustrate this invention:

EXAMPLES

To demonstrate that this method could be used with many thermoplastic polymers many satisfactory runs were made as shown in Table II. These runs were made in the following manner. Seventy-five parts of petroleum wax were placed in a suitable container and the temperature of the wax was raised to above its melting point but below the melting point of the polymer to be added. To the molten wax 25 parts of the polymer were added. Gentle agitation maintained the polymer particles uniformly distributed in the wax. This dispersion was applied to a cup board stock in the following manner. An oven was maintained at 160°F. In this oven was a roll of stock and several inches away was a doctor blade set to apply 2 to 5 mils of dispersion. The stock moved from the mounted roll under the doctor blade and out of the oven. The molten wax-polymer dispersion was applied to the cup board between the roll and the doctor blade. Thus as the cup board traveled under the doctor blade a predetermined thickness of dispersion was applied. Note that the thickness must be limited to lay down no more wax component than can be absorbed by the cup board. In these examples as the cup board left the oven much of the wax was absorbed by the cup board because of the slowness at which the stock moved.

The coated surface of the cup board was placed in contact with a mirror-finish plate (ferrotype) and backed with a second plate to facilitate handling, and the composite was placed between the platens of a press. The platen to be brought into immediate contact with the back side of the polished plate was preheated to 300°F., sufficient to fuse the polymer. The platens were closed loosely for a few seconds to heat the polished plate and the polymer particles. The pressure was then raised to about 300 p.s.i. and maintained for a short time (about 10 sec.). The pressure was released, and the assembly was removed from the press and cooled to about room temperature. The resulting product had a smooth, bright polymer surface and the porous stock was impregnated with wax.

Table II

Polymers and heating Conditions Used to Prepare Treated Stock[b]

| Run | Solid Polymers | Melting Point, °F. | Fusion Temp., °F. | Preheat | Fusion | Cooling | Mesh Size[a] |
|---|---|---|---|---|---|---|---|
| 1 | Polyethylene[c] | 280 | 350–400 | 10 | 10–15 | 60 | −200 |
| 2 | Polyethylene[h] | | | " | 10–20 | " | |
| 3 | Polypropylene[g] | 180 | 375–400 | " | 10–20 | " | — |
| 4 | Polystyrene[d] | 240 | 300–350 | " | 10–20 | " | −200, −140/+200 |
| 5 | Polymethylmethacrylate | 390 | 400 | " | 10–15 | " | −200, −140/+200 |
| 6 | Polyvinyl chloride[f] | 270 | 325–375 | " | 20 | " | — |
| 7 | Nylon 11 | 200 | 450 | " | 20 | " | −100 |
| 8 | Nylon 11 | — | 400 | — | — | — | — |
| 9 | Nylon 12 | — | 400 | — | — | — | — |
| 10 | Nylon 6 | — | 430 | — | — | — | — |
| 11 | Polycarbonate | — | 460 | 10 | 15–20 | 60 | −100 |
| 12 | Cellulose acetate butyrate[e] | 300 | 350 | " | 20 | " | — |
| 13 | Polyvinylidene | — | 300 | — | — | — | — |

(a) −200 mesh size means that all particles passed through a 200 mesh screen; −140/+200 mesh size means that all the particles passed through a 140 mesh screen but were retained on a 200 mesh.
(b) Cup boards, 14 mils, 61 lbs. per 1000 sq. ft.
(c) Molecular weight of 1.25 million.
(d) Medium impact.
(e) Contains 13 wt. % acetyl groups and 37% butyl groups
(f) Rigid.
(g) Molecular weight of 600,000.
(h) Molecular weight of 2.0 million.

To demonstrate that this method could be used to form various thicknesses of the polymer coatings on a cellulosic stock many additional runs were made as shown in the accompanying Table III. These runs were made in an analogous manner as that described for the data reported in Table II; however, the weight of polymer in the dispersion used varied from 25 to 60 percent. Also the data in Table III demonstrates that the amount of wax that impregnated the cellulosic stock can be varied substantially.

TABLE III

Film and Wax Loading on 185 lb/ream, 17-Point Tubstock

| Solid Polymer | Polymer in dispersion, weight % | Loading, lb/1000 ft² of Paper Total | Wax | Polymer | Thickness of polymer film, mils |
|---|---|---|---|---|---|
| Polypropylene[a] | 35 | 15.6 | 10.4 | 5.2 | 1.1 |
| Polyethylene[b] | 25 | 12.2 | 7.2 | 5.0 | 1.0 |
| Polyethylene[b] | 35 | 16.5 | 11.0 | 5.5 | 1.0 |
| Polystyrene | 40 | 18.6 | 11.5 | 7.1 | 1.3 |
| Polyvinylchloride[c] | 40 | 17.8 | 8.3 | 9.5 | 1.4 |
| Polyvinylchloride[c] | 40 | 11.6 | 6.5 | 5.1 | 0.7 |
| Polyvinylidene | 35 | 15.8 | 6.4 | 9.4 | — |
| Polymethylmethacrylate | 60 | 21.9 | 8.5 | 13.4 | 2.2 |
| Cellulose acetate butyrate | 50 | 19.2 | 10.8 | 8.4 | 1.3 |

(a) Molecular weight of 600,000.
(b) Molecular weight of 1.4 million.
(c) Rigid

The petroleum wax used in these examples had the following inspections:

| | |
|---|---|
| Melting point, ASTM D87 | 126°F. |
| Oil content, ASTM D721 | 0.4 |
| Color, Saybolt, ASTM D156 | +29 |
| Penetration at 77°F., ASTM D1321 | 18 |
| Viscosity, SUS at 210°F., ASTM D446 | 38.8 |
| Specific gravity at 212°F., ASTM D287 | 0.760 |

Other uncoated stocks were treated in a like manner and similar results were obtained.

To determine the relative performance of the treated cup board as a food wrapping, a modified test for grease resistance of paper (TAPPI T454 ts-66) was employed. The modification consisted of substituting peanut oil for the turpentine used in this TAPPI test procedure. Only the polystyrene and polyethylene (Runs 1 and 3) were tested on the polymer coated side. With both products no stain appeared on the book paper lying underneath the test specimen after 1,800 seconds. This is the maximum test time.

Additional performance tests were conducted on polyvinyl chloride coated 17 point tubstock and polystyrene coated 17 point tubstock. The results of these tests are shown in the accompanying Table IV.

The gloss developed by fusion of the polymer against polished surfaces was high in most cases. Polystyrene and polyvinyl chloride, as seen in Table IV, and other polymers that vary in structure from the wax vehicle, display excellent gloss and gloss retention. Polyethylene and polypropylene tended to retain a small amount of wax which subsequently bloomed to the surface and thus reduced gloss. Polycarbonate and polymethylmethacrylate films reflected 90 percent of incident light (black glass standard = 100 percent) even after several days of aging. The high blocking temperature, >170°F., and excellent scuff resistance reflect the natural surface properties of the polymer films.

was a satisfactory polystyrene coated, wax impregnated plywood.

An unsatisfactory run was made using a polyethylene with a molecular weight of 100,000. This polyethylene was substantially soluble in molten wax. When 25 parts of this polyethylene was added to 75 parts of molten wax a gel-type mixture formed. The viscosity of this gel was high and made the gel difficult to handle and apply. When this gel was applied to cup board the mixture of wax and polymer was absorbed by the cup board. The product that resulted had a soft non-glossy, wax-polymer surface with a wax-polymer impregnated substrate.

The invention claimed is:

1. Method of preparing an article comprising a wax impregnated porous cellulosic stock having a polymer coating, which comprises:
   a. establishing a heterogeneous composite consisting essentially of a thermoplastic polymer in finely divided form and molten wax, said polymer is selected from the group consisting of: polyethylene with a molecular weight in excess of 1,000,000, polypropylene with a molecular weight in excess of 100,000, acrylonitrile-butadiene-styrene copolymer, polyacetal, polyacrylic, cellulosic polymer, ionomer polymer, methyl pentene polymer, polyamide, phenylene oxide polymer, polycarbonate, polystyrene, rigid polyvinylchloride, polyvinylidene chloride and thermoplastic polyester;
   b. applying a coating of said heterogenous composite to a porous cellulosic substrate at a temperature above the melting point of the wax but below the melting point of the polymer; the amount of coating being regulated so that at least most of the wax therein is absorbable in cellulosic substrate;
   c. heating said coating to a temperature between the melting point of the polymer and the degradation temperature of the substrate and applying pressure

TABLE IV

| | Performance of Dispersion-Coated Tubstock | | | | | |
|---|---|---|---|---|---|---|
| | Rigid Polyvinyl chloride | | | Polystyrene | | |
| | | Loading | | | Loading | |
| | Performance Characteristic | Wax lb/ream | Film thickness mils | Performance Characteristic | Wax lb/ream | Film thickness mils |
| Water vapor permeability, (g/100 in.[2]/24 hr, TAPPI T 464 | 2.31 | 53 | 1.3 | 2.16 | 31 | 1.2 |
| Grease resistance, sec[a] | 1800+ | 46 | 0.8 | 1800+ | 34 | 1.2 |
| Gloss, % reflected[b] | | | | | | |
| Initial | 76 | 22 | 2.7 | 78 | 17 | 1.2 |
| Aged, 24 yr. | 78 | | | 78 | | |
| Blocking temp.,[c]°F. | >170 | 35 | 1.7 | >170 | 33 | 1.0 |
| Scuff resistance | Excellent | — | — | Excellent | — | — |
| Sealing strength | | | | | | |
| At 73°F | Tear | — | — | Tear | — | — |
| At 170°F | Tear | — | — | Tear | — | — |

(a) — Approximately 1 in. diam. pool of dyed peanut oil deposited on surface: time to penetrate and stain paper underneath.
(b) — Determined with Photovolt Glossmeter, angle 75° from normal. Black glass = 100% reflection.
(c) — Weighting conformed to TAPPI T 652; in oven at 170°F, 17 hr.

A ¼ inch thick, three ply indoor plywood was treated in an analogous method as described for the runs in Table II. The dispersion container 40 weight percent of polystyrene, fusion temperature was 300°F. and the applied pressure about 275 p.s.i. The resulting produce thereto to form a continuous molten polymer layer on the surface of the porous substrate;
   d. and thereafter cooling the resultant article.

2. Method according to claim 1 wherein said heterogeneous composite contains 5 to 65 parts by weight of finely divided polymer and 35 to 95 parts by weight of said wax.

3. Method according to claim 1 wherein all the finely divided polymer is finer than 100 mesh.

4. Method according to claim 1 wherein all the finely divided polymer is finer than 200 mesh.

5. Method according to claim 1 wherein the wax is a petroleum wax.

6. Method according to claim 5 wherein heterogeneous composite contains 5 to 65 parts by weight of finely divided polymer, said polymer being finer than 100 mesh.

7. Method according to claim 1 wherein the heterogeneous composite contains 5 to 65 parts by weight of finely divided polymer, said polymer being finer than 100 mesh, and the wax is a petroleum wax.

8. Method according to claim 7 wherein the thermoplastic polymer is selected from the group consisting of: polyethylene with a molecular weight in excess of 1,000,000, polypropylene with a molecular weight in excess of 100,000, polyamide, cellulosic, polystyrene, polycarbonate, rigid polyvinylchloride and acrylic.

9. Method according to claim 8 wherein said heterogeneous composite contains 10 to 55 parts by weight of finely divided polymer and 35 to 90 parts by weight of wax.

* * * * *